United States Patent

[11] 3,611,340

| [72] | Inventors | Robert B. Harte<br>Taylor;<br>Eric M. Aupperle, Ann Arbor; Charles C.<br>Hoopes, Ann Arbor, all of Mich. |
|---|---|---|
| [21] | Appl. No. | 767,335 |
| [22] | Filed | Oct. 14, 1968 |
| [45] | Patented | Oct. 5, 1971 |
| [73] | Assignee | Buhr Machine Tool Corporation |

[54] SERIES CIRCUIT MONITORING STRUCTURE
7 Claims, 2 Drawing Figs.

[52] U.S. Cl. .................................................. 340/255,
340/256
[51] Int. Cl. .................................................. H01h 47/00,
G08b 21/00
[50] Field of Search............................................. 340/255,
253, 248, 213, 415, 256

[56] References Cited
UNITED STATES PATENTS

| 2,719,966 | 10/1955 | Schurr............................ | 340/253 |
| 2,792,568 | 5/1957 | Scott et al...................... | 340/255 |
| 416,483 | 12/1889 | McMahon...................... | 340/255 UX |
| 2,660,717 | 11/1953 | Hood.............................. | 340/255 |
| 3,179,930 | 4/1965 | Pell ............................... | 340/256 X |

*Primary Examiner*—John W. Caldwell
*Assistant Examiner*—Daniel Myer
*Attorney*—Whittemore, Hulbert & Belknap ABSTRACT: Structure for and method of monitoring a relay contact circuit to determine closure of each of the contacts and if a contact is opened, to determine if a ground condition exists adjacent the contact, comprising a separate monitoring circuit in parallel with each of the relay contacts for sensing closure of the associated relay contact, a separate relay closed check circuit electrically connected to each monitoring circuit for indicating closure of the associated contact, and a separate ground check circuit electrically connected to the monitoring circuit for checking the ground condition at the relay contact associated with the monitoring circuit only if the associated relay contact is opened.

PATENTED OCT 5 1971 3,611,340
FIG.1
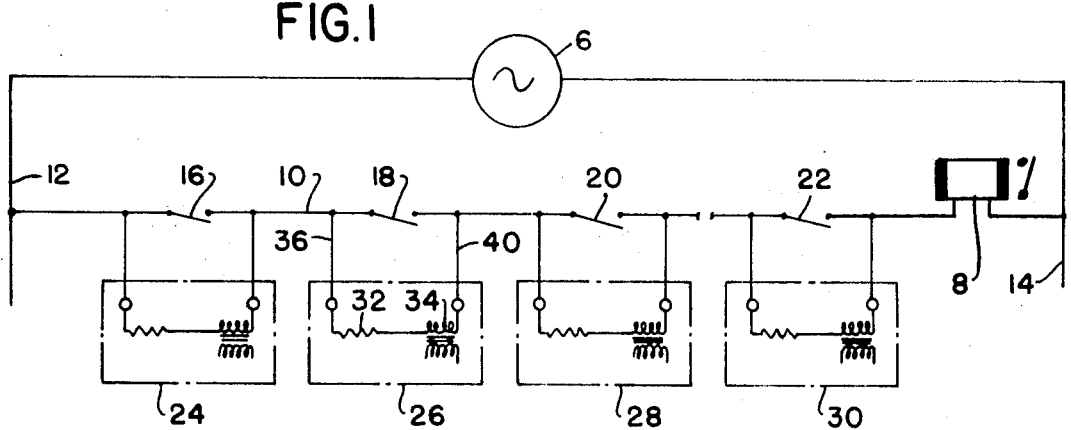
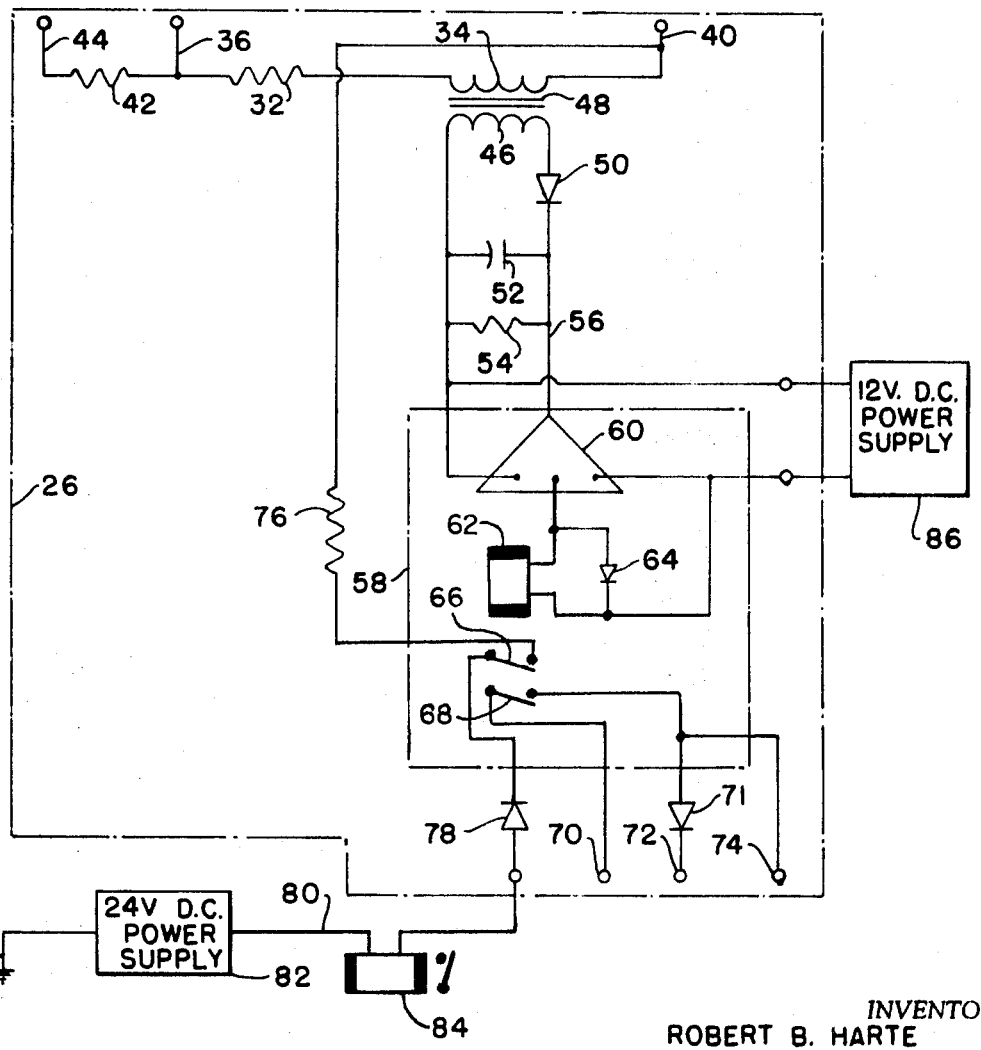
FIG.2
INVENTORS
ROBERT B. HARTE
ERIC M. AUPPERLE
CHARLES C. HOOPES
BY Whittemore, Hulbert & Belknap
ATTORNEYS

SERIES CIRCUIT MONITORING STRUCTURE

BACKGROUND OF THE INVENTION

1. Field of the Invention

The invention relates to circuit monitoring and refers more specifically to a structure for and method of determining when any relay contact or contacts of a series relay contact circuit are open and if a ground condition is present at the open relay contact of the series relay contact circuit and effecting a control function in accordance with the information determined.

2. Description of the Prior Art

In the past series relay contact circuits have often been checked contact by contact to determine which of a plurality of series relay contacts have not closed. This has been particularly time consuming and therefore expensive especially when more than one relay contact fails to close in a series relay contact circuit. No known structure or method has been provided in the past to determine without individual inspection the presence of a ground condition at a relay contact which has remained open in a series relay contact circuit.

SUMMARY OF THE INVENTION

In accordance with the invention, a plurality of separate monitoring circuits are provided in conjunction with a series relay contact circuit. One of the monitoring circuits monitors each of the relay contacts of the series relay contact circuit to be monitored. The individual monitoring circuits include means for closing a relay closed check circuit when the individual relay contact in the monitored circuit associated therewith is open and a means for closing a ground check circuit if a ground is present at an open relay contact in the monitored circuit.

In accordance with the method of the invention, the impedance across each particular relay contact in a series relay contact circuit is monitored to provide a signal when the relay is open. The detected signal is amplified when the relay is open and the amplified signal is used to actuate a relay in a relay open check circuit. In checking for a ground condition at the open relay contact, the impedance across the relay contact is first monitored and if the impedance is high in conjunction with a ground condition at the relay contact, the ground check circuit is energized.

BRIEF DESCRIPTION OF THE DRAWINGS

FIG. 1 is a schematic diagram of a series relay contact circuit including monitoring circuits in conjunction with each of the series relay contacts constructed in accordance with the invention.

FIG. 2 is a schematic diagram of one of the monitoring circuits illustrated in FIG. 1.

DESCRIPTION OF THE PREFERRED EMBODIMENT

As shown in FIG. 1, a series relay contact circuit 10 is provided extending in series with, for example, the relay coil 8 across the conductors 12 and 14. The conductors 12 and 14 may be connected to a power circuit 6 of, for example, a 115 volt, 60 Hertz, electric energy. The series connected relay contacts 16, 18, 20 and 22 in circuit 10 are adapted to be closed by external means. Thus the relay contacts 16, 18, 20 and 22 may, for example, be safety interlocks or the like.

Separate monitoring circuits 24, 26, 28 and 30 are shown in conjunction with each of the relay contacts 16, 18, 20 and 22 respectively of the monitored circuit 10. Only one of the monitoring circuits 26 will be considered in detail herein. The other monitoring circuits are the same as the circuit 26.

The monitoring circuit 26, as shown in FIG. 2, includes a resistor 32 and a transformer primary winding 34 connected in series across the conductors 36 an 40. The conductors 36 and 40 are also connected across the relay contact 18 as shown in FIG. 1. A separate resistor 42 between the conductor 36 and conductor 44 may be connected to the left side of the contact 18 to vary the operating characteristics of the circuit 10, if desired.

The secondary winding 46 of the transformer 48 is connected in a series circuit with a diode rectifier 50 and a filter capacitor 52 and resistor 54 connected in parallel to provide a rectified electrical signal on conductor 56 to the relay unit 58.

The relay unit 58 is a model S16'AA2 relay unit from the Sensitak Instrument Corporation of 531 Front Street, Manchester, New Hampshire, and is a purchased item. As shown, the unit 58 includes an operational amplifier 60, a reed relay coil 62 protected by a diode 64 and a pair of reed relay contacts 66 and 68, as shown. The unit 58 is provided with 12-volt-direct current electric energy from power supply 86.

The contact 68 is connected across a diode isolated relay contact upon check circuit at terminals 70 and 72 through diode 71. Alternatively, the terminal 74 may be used in conjunction with the relay contact 68 to provide a nonisolated relay contact open check circuit.

The contact 66 is connected through resistor 76 back to conductor 40 on the right side of the contact 18 in the monitored circuit 10. The other side of the contact 66, as shown, is connected through a diode 78 to the ground check circuit 80 including a 24 volt, DC power supply 82 for energizing the relay coil 84 when the relay coil is grounded through the contact 66, resistor 76 an a ground connection at the right side of the contact 18 in the monitored circuit.

In overall operation, when the monitored circuit 10 is supposedly complete, if all of the relay contacts 16, 18, 20 and 22 are closed, each of the monitoring circuits 24, 26, 28 and 30 are short-circuited so that the voltage through the transformer primary 34 thereof will be insufficient to close either of the relay contacts 66 or 68. Thus the relay coil 84 in the ground check circuit will be deenergized and the circuit through the conductors 72 or 74 and 70 will be incomplete.

However, should, for example, the relay contact 18 not close for some reason, the voltage across the resistor 32 and transformer primary winding 34 would be substantially the voltage of the source 6, for example, 115 volts. The monitoring circuits 24, 26, 28 and 30 are capable of being energized by anything from 12 to 115 volts so that even if all of the relay circuits 16, 18, 20 and 22 were open with a 115-volt source 6, the monitored circuit 26 would be energized. The relay coil 8 is such that it will not appear energized by the current through any of the monitoring circuits 24, 26, 28 and 30 with any contact 16, 18, 20 or 22 open.

The signal through the transformer 48 is rectified and filtered through the rectifier 50 and filter circuit including the capacitor 52 and resistor 54, after which it is amplified through the operational amplifier 60. The amplified signal through the operational amplifier 60 energizes the reed relay coil 62 to close the relay contacts 66 and 68.

Thus a signal indicating that the relay contact 18 is open will be present across conductors 70 and 72 or conductors 70 and 74 when the relay contact 18 is, in fact, open. A similar signal might, at the same time, be provided from the monitor circuits, 24, 28 and 30.

With the relay contact 66 closed, if a ground condition is present in circuit 10 between relay contact 18 and relay contact 20, a complete circuit is provided through the ground condition, conductor 40, resistor 76, contact 66, diode 78, relay 84, power supply 82 and the ground connection 90 in the ground check circuit 80. The relay coil 84 may then be used as desired to control or indicate the ground condition at contact 18.

It will be noted that if the ground condition is to the left of the relay contact 18, due to the relatively high value of the resistor 32 and the impedance of the transformer coil 34, both of which may be in the neighborhood of 100,000 ohms, as compared with the small resistor 76, the current through the relay coil 84 will be insufficient to energize the relay whereby the short condition would not be indicated by the monitoring circuit 26 but would be indicated by the monitoring circuit 24 provided the relay contact 16 were also open.

If the relay contact 18 is closed, there will be of course be no indication of a ground condition to the right of contact 18 since the contact 66 will be open.

In accordance with the above, there has been disclosed structure for and a method of changing any 60 cycle, alternating current voltage from 12 to 115 volt into an isolated dry circuit contact. Further means are provided to sense a single contact closure when the contact to be sensed is located in a series of contacts and a diode isolated output which may be used in a multiplexing array is presented in accordance with the sensed contact closure. Also in accordance with the disclosure, the point at which an open contact is indicated may be monitored for presence of a ground condition.

Further, it will be understood that the ground check circuit may be multiplexed to determine exactly where the ground condition indicated by closing of the relay 84 is located. Such multiplexing may be accomplished, for example, by selectively switching the power supply 86 between units 24, 26, 28 and 30.

While one embodiment of the present invention has been considered in detail and a modification thereof suggested, it will be understood that other embodiments and modifications are contemplated by the inventor. It is the intention to include all embodiments and modifications as are defined by the appended claims within the scope of the invention.

What I claim as my invention is:

1. A series circuit including a plurality of separate series connected circuit closure members, a separate monitoring circuit for each of the plurality of closure members operable to sense closure of the related circuit closure member and a closure member closed check circuit electrically connected to each monitoring circuit responsive to sensing of an open closure member by the associated monitoring circuit wherein each monitoring circuit includes a relatively high resistance and a transformer primary winding in series connected in parallel with the associated circuit closure member, a transformer secondary winding, a rectifier and filter means connected in series to provide a direct current signal representative of the condition of the associated closure member, an operational amplifier connected to receive the direct current signal, a relay coil connected to the operational amplifier and relay contact means connected in the closure member closed check circuit responsive to energizing of the relay coil in the monitoring circuit.

2. A series circuit including a plurality of separate series connected circuit closure members, a separate monitoring circuit for each of the plurality of closure members operable to sense closure of the related circuit closure member, a closure member closed check circuit electrically connected to each monitoring circuit responsive to sensing of an open closure member by the associated monitoring circuit and a ground check circuit electrically connected to the monitoring circuit and responsive to a ground condition at the associated circuit closure member including a resistor, a relay contact, an isolating diode, a relay coil and a power supply in series connected to one side of the associated circuit closure member and the associated monitoring circuit wherein the associated monitoring circuit includes means for closing the relay contact only when the associated circuit closure member is open.

3. A circuit as set forth in claim 1 wherein the closure member closed check circuit is diode isolated.

4. A circuit as set forth in claim 1 and further including a ground check circuit operably associated with the monitoring circuit and responsive to a ground condition at the associated circuit closure member.

5. Structure as set forth in claim 4 and further including means for indicating a ground condition at the associated circuit closure member only when the associated circuit closure member is open.

6. A series circuit including a plurality of separate series connected closure members, a separate monitoring circuit for each of the plurality of closure members operable to sense closure of the associated closure member, a closure member closed check circuit electrically connected to each monitoring circuit responsive to sensing of an open closure member by the associated monitoring circuit, and a ground check circuit electrically connected to the monitoring circuit and means within the monitoring circuit and the ground check circuit to a ground condition at the associated circuit closure member only when the associated circuit closure member is open.

7. An electric circuit including a plurality of separate, related circuit closure members, a separate monitoring circuit for each of the circuit closure members for sensing closure of the related circuit closure member utilizing only the energy in the circuit of the related closure member, a separate closure member closed check circuit electrically connected to each monitoring circuit responsive to sensing of an open closure member by the related monitoring circuit and a ground check circuit electrically connected to the monitoring circuit and responsive to a ground condition at the related closure member wherein the monitoring circuit includes a relay and means for energizing the relay in response to the related closure member being open and wherein the ground check circuit includes a relay contact in series therein which is electrically connected to the relay in the monitoring circuit to be closed when the relay is energized whereby the ground check circuit is operable only when the closure member related to the monitoring circuit is open.